United States Patent
Pelliconi et al.

(10) Patent No.: US 6,800,710 B2
(45) Date of Patent: Oct. 5, 2004

(54) POLYOLEFIN SHEETS FOR THERMOFORMING

(75) Inventors: Anteo Pelliconi, Santa Maria Maddalena (IT); Angelo Lonardo, Ferrara (IT); Gabriele Mei, Ferrara (IT)

(73) Assignee: Basell Poliolefine Italia S.p.A., Milan (IT)

(*) Notice: Subject to any disclaimer, the term of this patent is extended or adjusted under 35 U.S.C. 154(b) by 0 days.

(21) Appl. No.: 10/297,013

(22) PCT Filed: Dec. 13, 2001

(86) PCT No.: PCT/EP01/14667

§ 371 (c)(1),
(2), (4) Date: Nov. 27, 2002

(87) PCT Pub. No.: WO02/051912

PCT Pub. Date: Jul. 4, 2002

(65) Prior Publication Data

US 2003/0162907 A1 Aug. 28, 2003

(30) Foreign Application Priority Data

Dec. 22, 2000 (EP) .............................................. 00204737

(51) Int. Cl.⁷ .......................... C08F 10/00; C08F 110/06
(52) U.S. Cl. ................... 526/348.1; 526/348; 526/351; 526/124.1; 526/124.3; 526/123.1
(58) Field of Search .............................. 526/348.1, 348, 526/351, 124.1, 124.3, 123.1

(56) References Cited

U.S. PATENT DOCUMENTS

| | | | |
|---|---|---|---|
| 4,399,054 A | 8/1983 | Ferraris et al. | 252/429 B |
| 4,472,524 A | 9/1984 | Albizzati | 502/113 |
| 4,668,753 A | 5/1987 | Kashiwa et al. | 526/348 |
| 6,287,705 B1 | 9/2001 | Seta et al. | 428/500 |

FOREIGN PATENT DOCUMENTS

| | | | |
|---|---|---|---|
| EP | 0045977 | 2/1982 | C08F/4/64 |
| EP | 0339804 | 11/1989 | C08F/10/00 |
| EP | 0361493 | 4/1990 | C07C/43/10 |
| EP | 0728769 | 8/1996 | C08F/10/00 |
| EP | 0887357 | 12/1998 | C08F/10/00 |
| EP | 0916701 | 5/1999 | C08L/23/10 |
| EP | 1026184 | 8/2000 | C08F/297/08 |
| EP | 1110976 | 6/2001 | C08F/10/06 |
| EP | 1162213 | 12/2001 | C08F/210/06 |
| EP | 1162219 | 12/2001 | C08F/297/08 |
| WO | 0002929 | 1/2000 | C08F/10/00 |

Primary Examiner—Ling Siu Choi

(57) ABSTRACT

Polypropylene sheet for thermoforming having at least one layer comprises a propylene polymer containing at least 0.8% by weight of ethylene and, optionally, one or more $C_4$–$C_{10}$ α-olefins, or a propylene polymer composition containing at least 0.8% by weight of one or more comonomers selected from the group consisting of ethylene and $C_4$–$C_{10}$ α-olefins, and having I) a melting temperature of 155° C. or higher; and II) a xylene soluble fraction at room temperature lower than 4% by weight, and a value of the ratio of the polymer fraction collected at 25° C. to 95° C. to the xylene soluble fraction higher than 8.

5 Claims, No Drawings

POLYOLEFIN SHEETS FOR THERMOFORMING

This application is the U.S. national phase of International Application PCT/EP01/14667, filed Dec. 13, 2001.

The present invention relates to sheets for thermoforming based on a particular kind of propylene polymer or polymer composition.

Compared to sheets made of propylene homopolymers and copolymers with similar MFR, the sheets of the invention provide a better balance of processing characteristics and physical properties of the thermoformed items made therefrom. Thus, at the same or lower processing temperatures, the thermoformed items exhibit improved properties such as stiffness and impact resistance.

Therefore the present invention provides polypropylene sheets for thermoforming wherein at least one layer comprises a propylene polymer containing at least 0.8% by weight of ethylene and, optionally, one or more $C_4$–$C_{10}$ α-olefins, or a propylene polymer composition containing at least 0.8% by weight of one or more comonomers selected from the group consisting of ethylene and $C_4$–$C_{10}$ α-olefins, and having the following features:

I) a melting temperature of 155° C. or higher; and

II) a xylene soluble fraction at room temperature (about 25° C.) lower than 4% by weight, preferably lower than 3% by weight, more preferably lower than 2.5% by weight, and a value of the ratio of the polymer fraction collected at the temperature range from 25° C. to 95° C. (by TREF: temperature rising elution fractionation with xylene) to the said xylene soluble fraction, higher that 8 wt %/wt %, preferably higher than 10 wt %/wt %, more preferably higher than 12 wt %/wt %.

In a preferred embodiment, at least one layer is substantially made of the said propylene polymer or propylene polymer composition.

The said propylene polymer is a random copolymer (I) containing such an amount of comonomer(s) as to have a melting temperature (measured by DSC, i.e. Differential Scanning Calorimetry) of 155° C. or higher. When only ethylene is present as the comonomer, it is generally within 0.8 and 1.5% by weight with respect to the weight of the polymer. When $C_4$–$C_{10}$ α-olefins are present, they are generally within 1 and 4 wt % by weight with respect to the weight of the polymer.

Particularly preferred is a propylene polymer composition (II) comprising a first propylene (co)polymer (where the copolymer is a random copolymer) with an ethylene content between 0 and 1.5% by weight, and a second propylene random copolymer with an ethylene content between 0.8 and 5% by weight, the weight ratio of the second copolymer to the first (co)polymer being in the range from about 20:80 to about 80:20, preferably from 30:70 to 70:30, and the difference in the ethylene content between the two being preferably from 1 to 4 percentage units with respect to the weight of the (co)polymer concerned; or another propylene polymer composition (II) comprising a first propylene (co) polymer (where the copolymer is a random copolymer) with a comonomer content between 0 and 2% by weight, and a second propylene random copolymer with a comonomer content between 1.5 and 12% by weight, the weight ratio of the second copolymer to the first (co)polymer being in the range from about 20:80 to about 80:20, preferably from 30:70 to 70:30, and the difference in the comonomer content between the two being preferably from 1.5 to 10 percentage units with respect to the weight of the (co)polymer concerned, wherein the said comonomer is selected from $C_4$–$C_{10}$ α-olefins and mixtures thereof, with ethylene optionally being present. Preferably the Melt Flow Rate (MFR according to ISO 1133, 230° C., 2.16 Kg load) of the said propylene polymer or polymer composition goes from 1 to 10 g/10 min., more preferably from 1 to 4 g/10 min.

Other preferred features for the compositions to be used for the sheets the present invention are:

Polydispersity Index (PI): from 3.0 to 7, more preferably from 3.8 to 6.

The MFR values of the first propylene (co) polymer in composition (II) and of the second propylene random copolymer in composition (II) can be similar or substantially different.

In a particular embodiment of the present invention the MFR value of the first propylene (co)polymer is lower than that of the second propylene random copolymer and the difference in the MFR values being preferably greater than 5 g/10 min.

The $C_4$–$C_{10}$ α-olefins, that may be present as comonomers in the said propylene polymer or polymer composition, are represented by the formula $CH_2=CHR$, wherein R is an alkyl radical, linear or branched, with 2–8 carbon atoms or an aryl (in particular phenyl) radical. Examples of said $C_4$–$C_{10}$ α-olefins are 1-butene, 1-pentene, 1-hexene, 4-methyl-1-pentene and 1-octene. Particularly preferred is 1-butene.

The compositions of the present invention can be prepared by polymerization in one or more polymerization steps. Such polymerization is carried out in the presence of stereospecific Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminum compound, such as an aluminum alkyl compound.

An external donor is optionally added.

The catalysts generally used in the process of the invention are capable of producing polypropylene with an Isotacticity Index greater than 90%, preferably greater than 95%. Catalysts having the above mentioned characteristics are well known in the patent literature; particularly advantageous are the catalysts described in U.S. Pat. No. 4,399,054 and European patent 45977. Other examples can be found in U.S. Pat. No. 4,472,524. The solid catalyst components used in said catalysts comprise, as electron-donors (internal donors), compounds selected from the group consisting of ethers, ketones, lactones, compounds containing N, P and/or S atoms, and esters of mono- and dicarboxylic acids.

Particularly suitable electron-donor compounds are 1,3-diethers of formula:

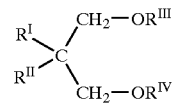

wherein $R^I$ and $R^{II}$ are the same or different and are $C_1$–$C_{18}$ alkyl, $C_3$–$C_{18}$ cycloalkyl or $C_7$–$C_{18}$ aryl radicals; $R^{III}$ and $R^{IV}$ are the same or different and are $C_1$–$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, said structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatoms as substitutes for carbon or hydrogen atoms, or both.

Ethers of this type are described in published European patent applications 361493 and 728769.

Representative examples of said diethers are 2-methyl-2-isopropyl-1,3-dimethoxypropane, 2,2-diisobutyl-1,3-dimethoxypropane, 2-isopropyl-2-cyclopentyl- 1,3-dimethoxypropane, 2-isopropyl-2-isoamyl-1,3-dimethoxypropane, 9,9-bis(methoxymethyl)fluorene. Other suitable electron-donor compounds are phthalic acid esters, such as diisobutyl, dioctyl, diphenyl and benzylbutyl phthalate.

The preparation of the above mentioned catalyst components is carried out according to various methods.

For example, a $MgCl_2 \cdot nROH$ adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds which can be used for the preparation of the solid catalyst component are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The active form of magnesium halide in the solid catalyst component can be recognized by the fact that in the X-ray spectrum of the catalyst component the maximum intensity reflection appearing in the spectrum of the nonactivated magnesium halide (having a surface area smaller than 3 $m^2/g$) is no longer present, but in its place there is a halo with the maximum intensity shifted with respect to the position of the maximum intensity reflection of the nonactivated magnesium dihalide, or by the fact that the maximum intensity reflection shows a width at half-peak at least 30% greater than the one of the maximum intensity reflection which appears in the spectrum of the nonactivated magnesium halide. The most active forms are those where the above mentioned halo appears in the X-ray spectrum of the solid catalyst component.

Among magnesium halides, the magnesium chloride is preferred. In the case of the most active forms of magnesium chloride, the X-ray spectrum of the solid catalyst component shows a halo instead of the reflection which in the spectrum of the nonactivated chloride appears at 2.56 Å.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical.

Examples of silicon compounds are $(tert-butyl)_2 Si(OCH_3)_2$, $(cyclohexyl)(methyl)Si(OCH_3)_2$, $(phenyl)_2 Si(OCH_3)_2$ and $(cyclopentyl)_2 Si(OCH_3)_2$. 1,3-diethers having the formulae described above can also be used advantageously. If the internal donor is one of these diethers, the external donors can be omitted.

In particular, even if many other combinations of the previously said catalyst components may allow to obtain polymers and polymer compositions having the previously said features 1) and 2), the random copolymers are preferably prepared by using catalysts containing a phthalate a inside donor and $(cyclopentyl)_2 Si(OCH_3)_2$ as outside donor, or the said 1,3-diethers as inside donors.

As previously said, the polymerization process can be carried out in one or more steps. In the case of composition (II), it can be carried out in at least two sequential steps, wherein the first propylene (co)polymer and the second propylene random copolymer are prepared in separate subsequent steps, operating in each step, except the first step, in the presence of the polymer formed and the catalyst used in the preceding step. Clearly, when the composition (II) contains additional (co)polymers, it becomes necessary to add further polymerization steps to produce them. The said polymerization steps can be carried out in separate reactors, or in one or more reactors where gradients of monomer concentrations and polymerization conditions are generated. The catalyst is generally added only in the first step, however its activity is such that it is still active for all the subsequent step(s).

The regulation of the molecular weight is carried out by using known regulators, hydrogen in particular.

By properly dosing the concentration of the molecular. weight regulator in the relevant steps, the previously described NFR values are obtained.

The whole polymerization process, which can be continuous or batch, is carried out following known techniques and operating in liquid phase, in the presence or not of inert diluent, or in gas phase, or by mixed liquid-gas techniques.

Reaction time, pressure and temperature relative to the two steps are not critical, however it is best if the temperature is from 20 to 100° C. The pressure can be atmospheric or higher. The catalysts can be pre-contacted with small amounts of olefins (prepolymerization).

It is also possible to employ a process for the catalytic polymerization in the gas-phase carried out in at least two interconnected polymerization zones, the process comprising feeding one or more monomers to said polymerization zones in the presence of catalyst under reaction conditions and collecting the polymer product from said polymerization zones, in which process the growing polymer particles flow upward through one of said polymerization zones (riser) under fast fluidisation conditions, leave said riser and enter another polymerization zone (downcomer) through which they flow downward under the action of gravity, leave said downcomer and are reintroduced into the riser, thus establishing a circulation of polymer between the riser and the downcomer, the process being optionally characterised in that:

means are provided which are capable of totally or partially preventing the gas mixture present in the riser from entering the downcomer, and a gas and/or liquid mixture having a composition different from the gas mixture present in the riser is introduced into the downcomer.

Such polymerization process is illustrated in WO 00/02929.

According to a particularly advantageous embodiment of this process, the introduction into the downcomer of the said gas and/or liquid mixture having a composition different from the gas mixture present in the riser is effective in preventing the latter mixture from entering the downcomer.

The composition (II) can also be obtained by preparing separately the said (co)polymers by operating with the same catalysts and substantially under the same polymerization conditions as previously explained (except that the said (co)polymers will be prepared in separate polymerization steps) and then mechanically blending said (co)polymers in the molten state. Conventional mixing apparatuses, like screw extrudres, in particular twin screw extruders, can be used.

The propylene polymers and propylene polymer compositions used for the sheets of the present invention can also contain additives commonly employed in the art, such as antioxidants, light stabilizers, heat stabilizers, nucleating agents, colorants and fillers. In particular, the addition of nucleating agents brings about a considerable improvement in important physical-mechanical properties, such as Flexural Modulus, Heat Distortion Temperature (HDT), tensile strength at yield and transparency.

Typical examples of nucleating agents are sodium benzoate, the p-tert-butyl benzoate and the 1,3- and 2,4-dibenzylidenesorbitols.

The nucleating agents are preferably added in quantities ranging from 0.05 to 2% by weight, more preferably from 0.1 to 1% by weight with respect to the total weight.

The addition of inorganic fillers, such as talc, calcium carbonate and mineral fibers, also brings about an improvement to some mechanical properties, such as Flexural Modulus and HDT. Talc can also have a nucleating effect.

The thickness of the sheets of the present invention is generally over 250 $\mu$m. They can be monolayer or multilayer sheets.

In the multilayer sheets, it is preferable that at least the base (core) layer comprise the said propylene polymer or propylene polymer composition having the features 1) and 2). The other layers may comprise other kinds of polymers.

Examples of olefin polymers that can be used for the other layers are polymers or copolymers, and their mixtures, of $CH_2=CHR$ olefins where R is a hydrogen atom or a $C_1$–$C_8$ alkyl radical.

Particularly preferred are the following polymers:

a) isotactic or mainly isotactic propylene homopolymers, and homopolymers or copolymers of ethylene, like HDPE, LDPE, LLDPE;

b) crystalline copolymers of propylene with ethylene and/or $C_4$–$C_{10}$ α-olefins, such as for example 1-butene, 1-hexene, 4-methyl-1-pentene, 1-octene, wherein the total comonomer content ranges from 0.05% to 20% by weight with respect to the weight of the copolymer, or mixtures of said copolymers with isotactic or mainly isotactic propylene homopolymers;

c) elastomeric copolymers of ethylene with propylene and/or a $C_4$–$C_{10}$ α-olefin, optionally containing minor quantities (in particular, from 1% to 10% by weight) of a diene, such as butadiene, 1,4-hexadiene, 1,5-hexadiene, ethylidene-1-norbornene;

d) heterophasic copolymers comprising a propylene homopolymer and/or one of the copolymers of item b), and an elastomeric fraction comprising one or more of the copolymers of item c), typically prepared according to known methods by mixing the components in the molten state, or by sequential polymerization, and generally containing the said elastomeric fraction in quantities from 5% to 80% by weight;

e) 1-butene homopolymers or copolymers with ethylene and/or other α-olefins.

Examples of polymers different from polyolefins, employable for the other layers, are polystyrenes, polyvinylchlorides, polyamides, polyesters and polycarbonates.

The sheets of the present invention can be prepared by using the extrusion and extrusion/lamination processes known in the art.

Finally, the sheets of the present invention can undergo a series of subsequent operations, before thermoforming, such as:

surface embossing, by heating the surface compressing it against the embossing roller; printing, after having made the surface ink sensitive through oxidating (for instance flame) or ionizing treatments (for instance corona discharge treatment);

coupling with fabric or film, particularly polypropylene, by heating of the surfaces and compression;

coextrusion with other polymeric or metallic materials (e.g. aluminum film);

plating treatments (depositing a layer of aluminum through evaporation under vacuum, for example).

Depending upon the specific kind of sheet and final treatment, the sheets of the present invention can be thermoformed into many kind of articles, in particular packaging containers, like cups and bottles.

The thermoformed articles can be prepared by subjecting the sheets of the present invention the thermoforming processes known in the art, including, but not limited to, vacuum forming, pressure forming, solid pressure forming, solid press forming, and stamping forming.

Such processes generally are carried out by heating the sheets, for instance with rolls, heating plates or indirect heating means, like radiant electric beaters, and forcing the sheets to fit the shape of a mold, for instance by sucking them against the mold.

The temperatures used for thermoforming the sheets of the present invention depends on the thermoforming process, and is usually in the range from 100° C. to 270° C.

The following examples are given to illustrate the present invention without limiting purpose.

The data relating to the polymeric materials and the sheets of the examples are determined by way of the methods reported below.

MFR: ISO 1133, 230° C., 2.16 Kg;

Melting and crystallization temperature: by DSC with a temperature variation of 20° C. per minute;

ethylene content: by IR spectroscopy;

Flexural Modulus: ISO 178;

Polydispersity Index (PI): measurement of molecular weight distribution of the polymer. To determine the PI value, the modulus separation at low modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

$$PI = 54.6 \times (\text{modulus separation})^{-1.76}$$

wherein the modulus separation (MS) is defined as:

$$MS = (\text{frequency at } G'\ 500\ \text{Pa})/(\text{frequency at } G''=500\ \text{Pa})$$

wherein G' is the storage modulus and G" is the low modulus.

Fractions soluble and insoluble in xylene at 25° C.: 2.5 g of polymer are dissolved in 250 ml of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum a 80° C. until constant weight is reached. Thus one calculates the percent by weight of polymer soluble and insoluble at room temperature (25° C.).

TREF

About 1 g of sample is dissolved in 200 mL of o-xylene, stabilized with 0.1 g/L, of Irganox 1010 (pentaerythritol tetrakis 3-(3,5-di-tert-butyl-4-hydroxyphenyl)propanoate). The dissolution temperature is in the range of 125–135° C. The resulting solution is poured off into a column packed with glass beads and subsequently cooled down slowly in 16.5 h to 25° C.

The first fraction is obtained at room temperature eluting with o-xylene. The second fraction is collected after having raised the column temperature up to 95° C. The polymer component soluble between 25 and 95° C. is collected as a single fraction.

The successive fractions are eluted with o-xylene while the temperature is raised linearly between 95 and 125° C. Each fraction, recovered as a 200 mL solution, is collected at 1° C. temperature increments. The polymer fractions are subsequently precipitated with acetone, filtered on a 0.5 μm PTFE filter, dried under vacuum at 70° C., and weighed.

Top Load

It is the maximum squeezing force before collapse (buckling) of the walls of the bottle.

EXAMPLES 1 to 3 AND COMP. EXAMPLE 1

The polymers of Examples 1 to 3 are prepared by polymerizing propylene and ethylene under continuous conditions in a plant comprising a gas phase polymerisation apparatus.

The catalyst was sent to the gas phase polymerisation apparatus. The latter comprised two interconnected cylindrical reactors, riser 1 and downcomer 2. Fast fluidisation conditions were established in reactor 1 by recycling gas from the gas-solid separator.

The way to differentiate the gas composition in the two reactor legs was the "barrier" feed. This stream was propylene fed in the larger upper part of the downcomer.

The catalyst employed comprised a catalyst component prepared by analogy with Example 5 of EP A 728 769, but using microspheroidal $MgCl_2 \cdot 1.7 C_2H_5OH$ instead of $MgCl_2 \cdot 2.1 C_2H_5OH$.

Such catalyst component was used with dicyclopentyldimethoxysilane as external donor and with triethylaluminium (TEAL). The weight ratio TEAL/catalyst component was 5; the weight ratio TEAL/external donor was 4. Other operative conditions and the characteristics of the produced polymers are indicated in Table 1.

The main features of a conventional propylene polymer for BOPP are reported in Table 1 under Comp. 1.

TABLE 1

| Ex. | | 1 | 2 | 3 | Comp. 1 |
|---|---|---|---|---|---|
| NaBz | wt % | 0.09 | 0.09 | 0.09 | 0.09 |
| 1st component | | | | | |
| Temperature | ° C. | 85 | 85 | 85 | — |
| Split | wt % | ≅50 | ≅50 | ≅50 | — |
| C2-/(C2- + C3-) | mol/mol | 0.01 | 0.01 | 0.04 | — |
| 2nd component | | | | | |
| Split | wt % | ≅50 | ≅50 | ≅50 | — |
| C2-/(C2- + C3-) | mol/mol | ≅0.001 | ≅0.001 | ≅0.001 | — |
| MFR "L" | g/10 min. | 2.4 | 2.3 | 2.8 | 3.5 |
| P.I. | | 3.75 | 3.71 | 4.14 | 4.03 |
| Xylene Soluble | wt % | 2 | 2.2 | 2.2 | 4 |
| Xylene Insoluble | wt % | 98 | 97.8 | 97.8 | 96 |
| C2- content | wt % | 1.4 | 1.3 | 1.4 | 0 |
| Soluble fraction at the temperature: 25–95° C. | wt % | 29.1 | 32.7 | 32.3 | 15.9 |
| D.S.C. Melting temperature | ° C. | 160.15 | 161.1 | 161.4 | 163.5 |
| D.S.C. Melting enthalpy | J/g | 102.2 | 104.15 | 100.8 | 104.8 |
| D.S.C. Solidific. temperature | ° C. | 123.5 | 122.9 | 122.6 | 124.5 |

Note:
NaBz = sodium benzoate;
1st component = polymer produced in riser;
2nd component = polymer produced in downcomer;
Split = amount of polymer produced;
wt % = % by weight;
C2- = ethylene;
C3- = propylene;
C2-/(C2- + C3-) = monomer feed ratio.

The table below describes the results obtained performed under ISO test method. With respect to Comp. 1, the polymers falling in the definition of the invention showed slightly lower values of the MFR, slightly higher values of the flexural modulus, substantially higher values of the notched Izod impact at 23° C. and improved optical properties.

TABLE 2

| Polymer of Ex. | 1 | 2 | 3 | Comp. 1 |
|---|---|---|---|---|
| MFR, g/10 min. | 2.4 | 2.3 | 2.8 | 3.5 |
| Flexural Mod, Mpa | 1513 | 1546 | 1531 | 1396 |
| Izod 23° C., kJ/m² | 12 | 12 | 18 | 6.6 |
| Izod 0° C., kJ/m² | 2.6 | 2.5 | 3.0 | 2.1 |
| Haze on 1 mm plaque, % | 28.5 | 29 | 25 | 38.7 |
| Gloss on 1 mm plaque, % | 110 | 109 | 112 | 104 |

The resins of the examples were extruded into 1.5 mm thickness sheet. After one week conditioning, the sheet has been thermoformed into 200 cc round cups.

The Table below reports the optical properties measured on the thermoformed cups at different oven temperatures.

When compared to Comp. 1, the polymers falling in the definition of the invention required slightly lower heating and a broader operating window.

TABLE 3

| | Oven T °C. | Ex. 1 | Ex. 2 | Ex. 3 | Comp. 1 |
|---|---|---|---|---|---|
| Haze, % | 320 | — | — | — | — |
| | 325 | — | — | — | — |
| | 330 | 20 | 3.5 | 2.3 | — |
| | 335 | 13 | 3.6 | 2.8 | — |
| | 340 | 6.5 | 3.1 | 3.9 | 2.4 |
| | 345 | 4.1 | 2.8 | 6.9 | 4.0 |
| | 350 | — | 3.4 | — | 8.1 |
| Clarity, % | 320 | — | — | — | — |
| | 325 | — | — | — | — |
| | 330 | 78 | 93 | 94 | — |
| | 335 | 85 | 93 | 95 | — |
| | 340 | 91 | 94 | 95 | 97 |
| | 345 | 93 | 93 | 94 | 97 |
| | 350 | — | 91 | — | 91 |
| Gloss | 320 | — | — | — | — |
| | 325 | — | — | — | — |
| | 330 | 60 | 79 | 82 | — |
| | 335 | 61 | 77 | 81 | — |
| | 340 | 61 | 74 | 77 | 84 |
| | 345 | 60 | 73 | 61 | 78 |
| | 350 | — | 72 | — | 58 |

On thermoformed items, the rigidity/impact balance was substantially better than for Comp. 1. It can also be seen that, after thermoforming, the polymers falling in the definition of the invention had slightly better optical performances than Comp. 1 and that this performance was achievable at lower thermoforming temperatures.

TABLE 4

| | Oven T °C. | Ex. 1 | Ex. 2 | Ex. 3 | Comp. 1 |
|---|---|---|---|---|---|
| Weight, g | | 5.3 | 5.5 | 5.5 | 5.4 |
| Top load, N | 320 | — | — | — | — |
| | 325 | — | — | — | — |
| | 330 | 154 | 171 | 172 | — |
| | 335 | 150 | 178 | 159 | — |
| | 340 | 138 | 160 | 146 | 156 |
| | 345 | 123 | 155 | 129 | 132 |
| | 350 | — | 131 | — | 119 |
| CIT 5° C., g (impact test) | 320 | — | — | — | — |
| | 325 | — | — | — | — |
| | 330 | — | — | — | — |
| | 335 | — | — | 336 | — |
| | 340 | 310 | 258 | — | — |
| | 345 | — | — | — | 208 |
| | 350 | — | — | — | — |

Thus, sheets of this invention, compared to sheets of conventional polypropylene of substantially the same MFR, provide a broader thermoforming operating window, a substantially improved impact/stiffness balance and improved optical properties of thermoformed articles made therefrom.

What is claimed is:

1. A polyolefin sheet for thermoforming wherein at least one layer comprises a propylene polymer containing at least 0.8% by weight of ethylene and, optionally, one or more $C_4$–$C_{10}$ α-olefins, or a propylene polymer composition containing at least 0.8% by weight of one or more comonomers selected from the group consisting of ethylene and $C_4$–$C_{10}$ α-olefins, said polymer or polymer composition having the following features:
    I) a melting temperature of 155° C. or higher; and
    II) a xylene soluble fraction at room temperature (about 25° C.) lower than 4% by weight, and a value of the ratio of the polymer fraction collected by TREF at a temperature from 25° C. to 95° C. to the xylene soluble fraction at room temperature higher than 8 wt %/wt %.

2. The sheet of claim 1, wherein the Melt Flow Rate (MFR according to ISO 1133, 230° C., 2.16 Kg load) of the said propylene polymer or polymer composition is from 1 to 10 g/10 min.

3. The sheet of claim 1, wherein at least one layer comprises a propylene random copolymer (I) in which, when only ethylene is present as the comonomer, it is within 0.8 and 1.5% by weight with respect to the weight of the polymer, and when $C_4$–$C_{10}$ α-olefins are present, they are generally within 1 and 4 wt % by weight with respect to the weight of the polymer.

4. The sheet of claim 1, wherein at least one layer comprises a propylene polymer composition (II) comprising a first propylene (co)polymer (where the copolymer is a random copolymer) with an ethylene content between 0 and 1.5% by weight, and a second propylene random copolymer with an ethylene content between 0.8 and 5% by weight, the weight ratio of the second copolymer to the first (co)polymer being in the range from about 20:80 to about 80:20, and the difference in the ethylene content between the two being from 1 to 4 percentage units with respect to the weight of the (co)polymer concerned.

5. The sheet of claim 1, wherein at least one layer comprises a propylene polymer composition (II) comprising a first propylene (co)polymer (where the copolymer is a random copolymer) whit a comonomer content between 0 and 2% by weight, and a second propylene random copolymer with a comonomer content between 1.5 and 12% by weight, the weight ratio of the second copolymer to the first (co)polymer being in the range from about 20:80 to about 80:20, and the difference in the comonomer content between the two being preferably from 1.5 to 10 percentage units with respect to the weight of the (co)polymer concerned, wherein the said comonomer is selected from the group consisting of $C_4$–$C_{10}$ α-olefins and mixtures thereof, with ethylene optionally present.

* * * * *